United States Patent [19]

Cook et al.

[11] Patent Number: 5,313,386
[45] Date of Patent: May 17, 1994

[54] PROGRAMMABLE CONTROLLER WITH BACKUP CAPABILITY

[75] Inventors: William B. Cook, Northfield; Robert D. Eaton, North Ridgeville, both of Ohio

[73] Assignee: Allen-Bradley Company, Inc., Milwaukee, Wis.

[21] Appl. No.: 897,172

[22] Filed: Jun. 11, 1992

[51] Int. Cl.$^5$ .............................................. G06F 15/46
[52] U.S. Cl. ..................... 364/187; 371/9.1; 364/926.9; 364/949; 364/DIG. 2
[58] Field of Search .................. 364/131–134, 364/184, 187, 949–949.2, 926.9–926.93, 937.01, 943.91, 944, 944.2; 371/8.1, 9.1; 395/275

[56] References Cited

U.S. PATENT DOCUMENTS

| | | |
|---|---|---|
| 3,797,612 | 3/1974 | Struger et al. |
| 3,813,649 | 5/1974 | Struger et al. |
| 4,070,702 | 1/1978 | Grants et al. |
| 4,276,593 | 6/1981 | Hansen ............................ 364/187 |
| 4,351,023 | 9/1982 | Richer ............................ 364/187 |
| 4,413,319 | 11/1983 | Schultz et al. |
| 4,521,871 | 6/1985 | Galdun et al. ................... 364/187 |
| 4,610,013 | 9/1986 | Long et al. ....................... 371/9.1 |
| 4,797,884 | 1/1989 | Yalowitz et al. ................ 364/187 |
| 4,858,101 | 8/1989 | Stewart et al. |

Primary Examiner—Jerry Smith
Assistant Examiner—Steven R. Garland
Attorney, Agent, or Firm—Quarles & Brady

[57] ABSTRACT

A machine is controlled by a system which has a pair of programmable controllers connected in tandem. One controller operates in the active mode governing the operation of the machine, while the other controller is in a backup mode able to assume control of the machine should the active controller fail. Each programmable controller has a backup module through which the two controllers are connected. In order to determine which controller is to be active upon power up, each backup module has an input means for receiving a first active mode request signal from another programmable controller. A means is provided to produce a tie breaker signal at one backup module which indicates that its programmable controller is to operate in the active mode when both programmable controllers simultaneously desire to operate in the active mode. A mode indicator in the backup module designates the active mode when the input means does not receive the first active mode request signal, or when the input means is receiving the first active mode request signal and the tie breaker signal is being produced at that backup module. Otherwise, the mode indicator designates that the programmable controller is to operate in the backup mode. An output means transmits a second active mode request signal to the other programmable controller when the mode indicator designates the active mode.

13 Claims, 9 Drawing Sheets

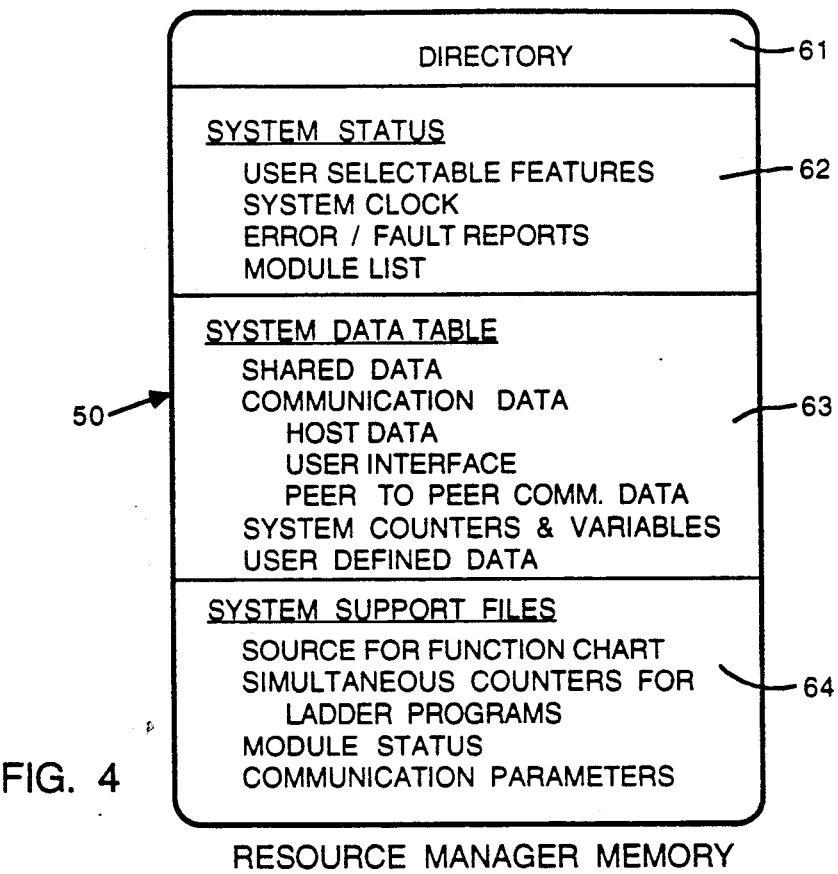
FIG. 4  RESOURCE MANAGER MEMORY
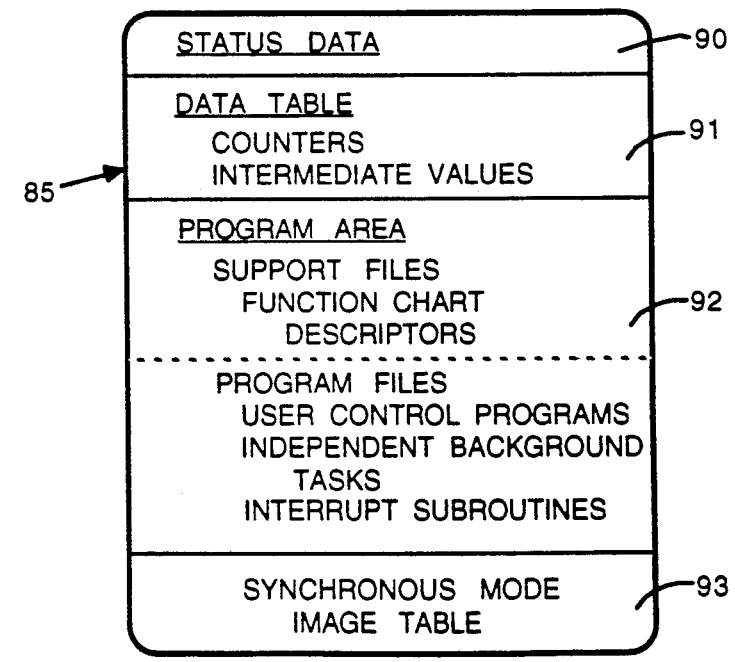
FIG. 6  PROGRAM EXECUTION PROCESSOR MEMORY

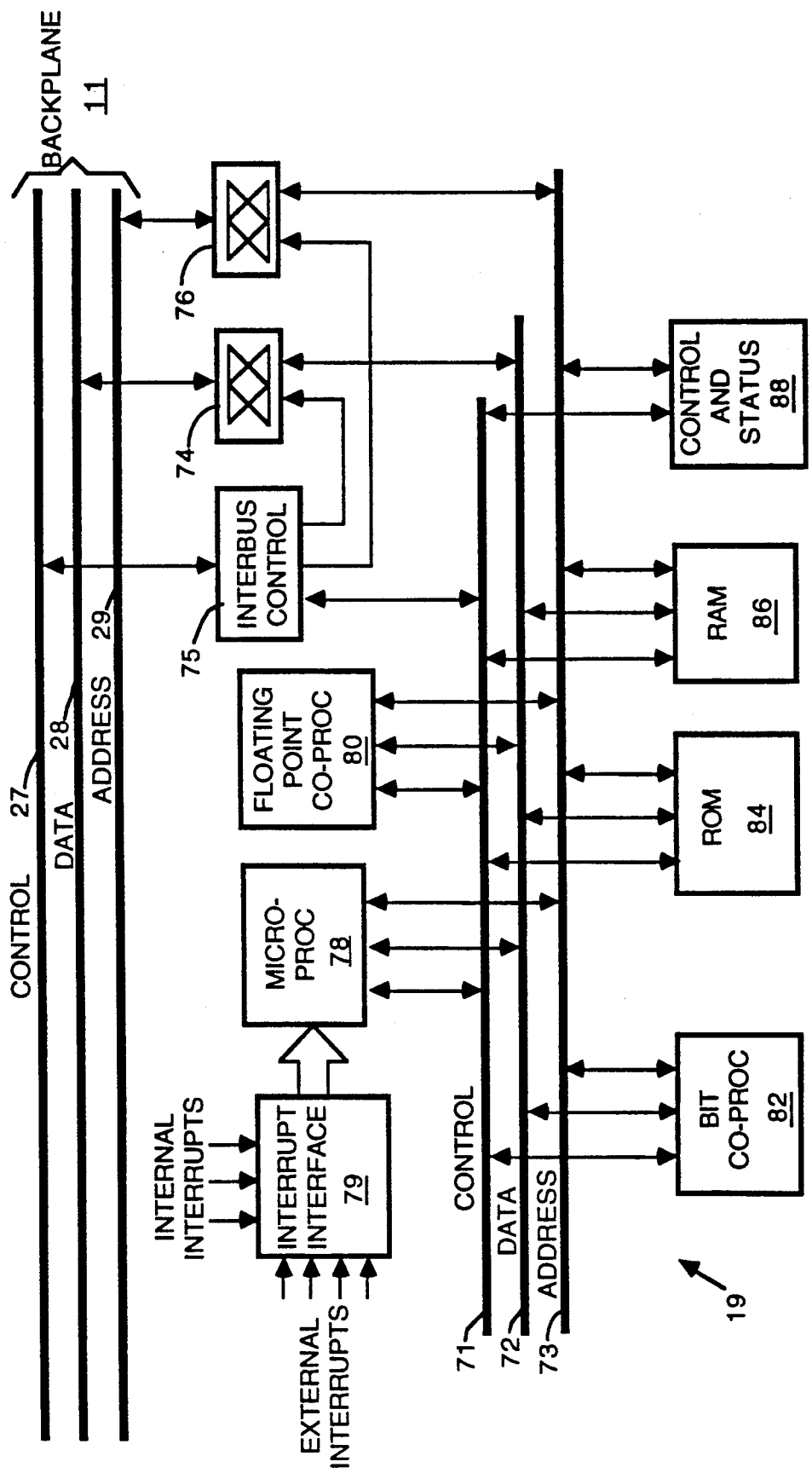

I/O SCANNER MODULE

BACKUP MODULE 22

STATE DIAGRAM OF
STATE MACHINE 150

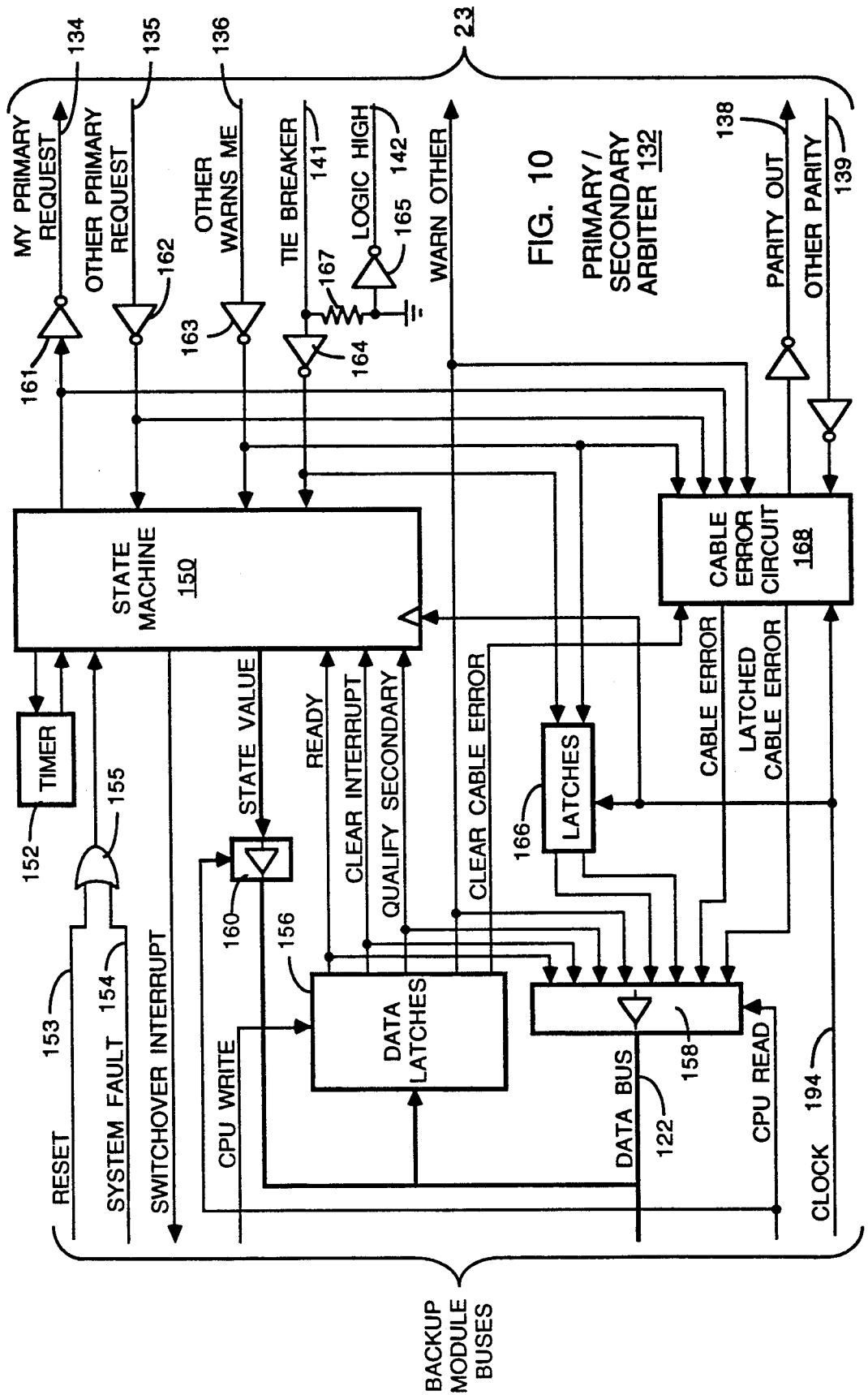
FIG. 10 PRIMARY/SECONDARY ARBITER 132

CABLE ERROR CIRCUIT

PROGRAMMABLE CONTROLLER WITH BACKUP CAPABILITY

The present invention relates to programmable controllers for operating industrial equipment, such as the one described in U.S. Pat. No. 4,858,101; and more specifically to the connection of two programmable controllers where one can take over the control functions in the event the other one fails.

BACKGROUND OF THE INVENTION

Programmable controllers are a common type of industrial computer for operating a wide variety of manufacturing equipment, such as assembly lines and machine tools, in accordance with a stored program. The program comprises a series of process control instructions which are read out and executed to examine the state of selected sensing devices on the controlled equipment, and to energize or deenergize selected operating devices contingent upon the state of one or more of the examined sensing devices.

The state of many sensing and operating devices can be represented by a single bit of data which is manipulated by the control program instructions. Other devices, such as position sensors, provide multiple bits of data representing a condition of the equipment being controlled. For these latter devices, instructions are provided to manipulate bytes and words of data representing the state of the sensing and operating devices. Additional program instructions perform arithmetic operations, timing and counting functions, and complex statistical reporting operations. Such instructions have become quite standardized in the industry and are directly associated with the elements of a ladder logic diagram which is easily understood by process control engineers. Program panels such as those described in U.S. Pat. Nos. 3,798,612; 3,813,649 and 4,070,702 have been developed to assist the user in developing and editing ladder logic control programs comprised of such programmable controller instructions.

There are many applications of programmable controllers in which "down time" resulting from malfunction of the controller must be minimized. For example, the cost of shutting down an automobile assembly line is enormous and extraordinary measures are taken to insure that quality components are employed in the control systems. In other manufacturing systems, such as chemical processing, failure of the control system can result in the loss of life or a large quantity of the product being produced. Despite these efforts it is statistically certain that malfunctions or failures will occur in the electrical and mechanical components.

An inherent characteristic of programmable controllers is the concentration of decision making functions of the system in certain subsystems and components. For example, a malfunction of the memory which stores the control program or a malfunction of the processor that reads and executes the control program is catastrophic in the sense that the entire system being controlled is affected. Malfunction detection techniques are employed to sense and quickly diagnose such problems and components are mounted on circuit boards for easy replacement. However even when a malfunction is quickly discovered, diagnosed and fixed, the resetting and power-up of the manufacturing system consumes considerable time.

The use of redundant components or modules is a common practice in a number of fields. In the aerospace field, for example, there is multiple redundancy of the entire flight control system and in the data processing field it is common to provide redundant processors or input/output controllers. In the industrial control field redundancy of the entire system is economically impractical. As a result one approach, described in U.S. Pat. No. 4,521,871, doubles selected hardware components which perform the program storage and execution functions. One set of the components is designated as the primary unit and the other as the backup unit which takes control of the system only when the primary unit fails. In order for a transition from one set of components to the other to occur smoothly, both sets must have the same information regarding the status of the manufacturing process and equipment. In addition, it has been found desirable that each set of components have knowledge of the status of the other set.

SUMMARY OF THE INVENTION

A programmable controller has a memory which stores a control program and data, such as I/O image tables and operating status data. An input/output circuit is provided to exchange data between the I/O image tables and devices on a machine being controlled by the programmable controller. A processor is included which executes the control program to examine data in the input image table and alter the data in the output image table.

The programmable controller further includes a backup module that comprises an input means for receiving a first signal when another programmable controller requests to operate in an active mode and control the operation of the machine. An input terminal is provided to receive a tie breaker signal indicating that the programmable controller is to operate in the active mode when several programmable controllers request to control the operation of the machine at substantially the same time.

An indicator designates that the programmable controller is to operate in the active mode in response to the absence of the first signal at the input means or if the first signal is received when the tie breaker signal is received at the input terminal. Otherwise the indicator designates that the programmable controller is to operate in a backup mode. In the preferred embodiment, the indicator designates a disqualified mode instead of the backup mode, when a warning signal is received from another programmable controller, or when the programmable controller has insufficient data to enable it to assume control.

An output means transmits a request to operate in the active mode to another programmable controller when the indicator designates that the programmable controller is capable of operating in the active mode. The request to operate in the active mode is not transmitted when the indicator designates that the programmable controller is to operate in the backup or disqualified modes.

A general object of the present invention is to provide a mechanism by which two programmable controllers can be connected to operate a machine, with one of the controllers actively controlling the machine while the other one is in a backup mode and able to assume control in the event that the one controller becomes faulty.

Another object is to provide a mechanism which permits the programmable controllers to decide upon power up or upon being reset which one is to be the active device and which the backup.

A further object in the preferred embodiment of the present invention is to incorporate a mechanism by which one programmable controller is able to warn the other of suspected faults and errors.

Yet another object of the preferred embodiment is to provide a communication interface for periodically exchanging I/O image table and operating status data with another programmable controller. This exchange transfers that data from the active programmable controller to the backup programmable controller so that the backup device can readily assume control of the machine if the active controller fails.

BRIEF DESCRIPTION OF THE DRAWINGS

FIG. 4 is a memory map of a shared system memory in the resource manager module;

FIG. 5 is a schematic diagram of a processor module in each programmable controller;

FIG. 6 is a memory map of the memory contained in the processor module;

FIG. 10 is a diagram of the circuitry of the primary/secondary arbiter in the backup module;

DETAILED DESCRIPTION OF THE INVENTION

Figure 1:
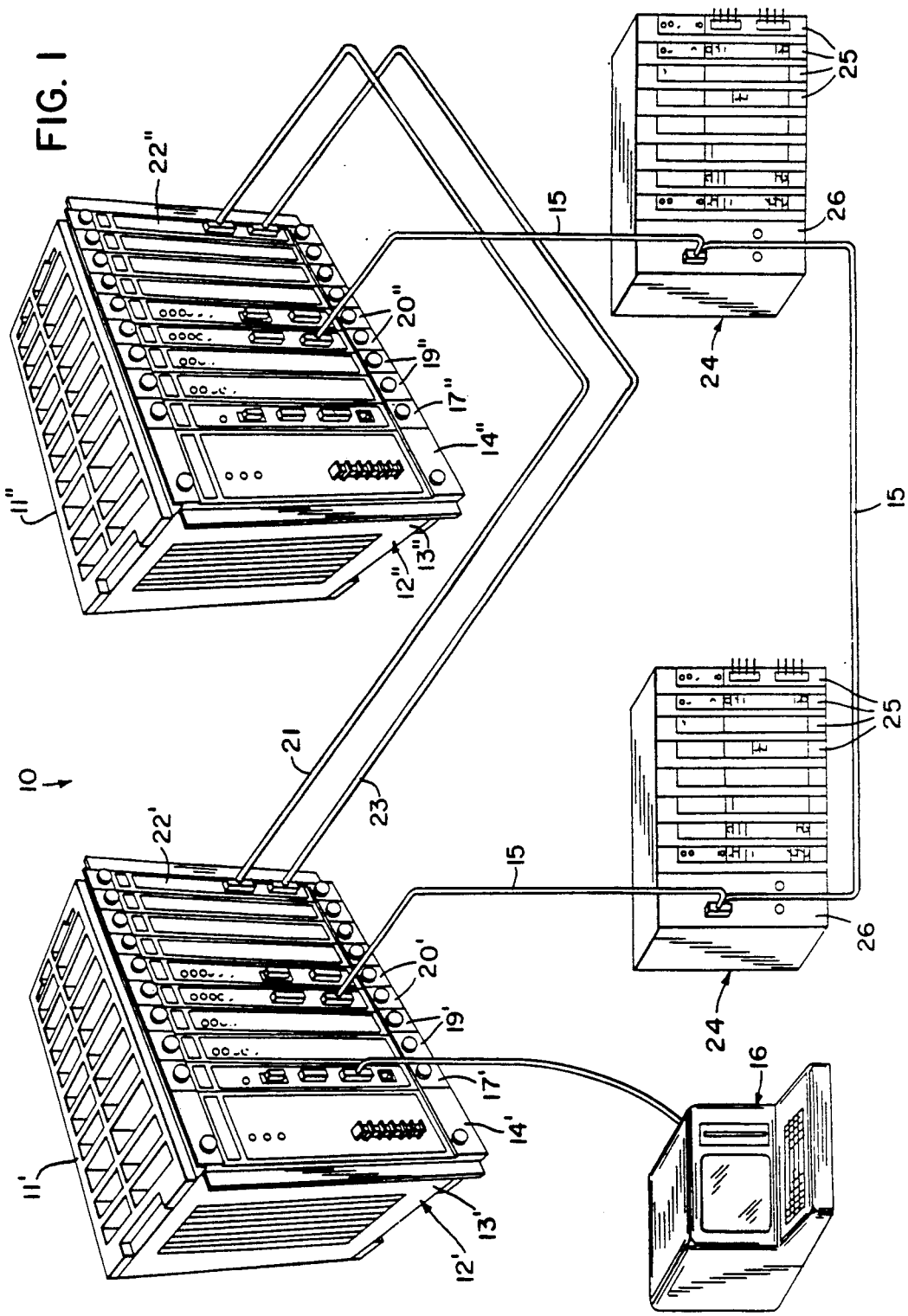
FIG. 1 is a pictorial representation of two programmable controllers connected according to the present invention.

With initial reference to FIG. 1, a control system 10 has two programmable controllers 12' and 12" connected in tandem. The components of the first programmable controller are denoted by primed reference numerals while the other programmable controller components have double primed reference numerals. The reference number alone will be used to describe component features that are the same in both programmable controllers.

Each programmable controller is housed in rack 13' or 13" which has a series of slots that receive a plurality of printed circuit board modules. These functional modules connect to a mother board which extends along the back surface of the rack to provide a backplane 11' and 11". The backplane 11 has a plurality of module connectors which are interconnected by a conductive pattern on the backplane. The backplane 11 provides a series of signal buses to which the modules connect. Each rack 13' and 13" contains a power supply module 14' or 14", a resource manager module 17' or 17", a number of processor modules 19' or 19" and a remote input/output (I/O) scanner module 20' or 20". In the illustrated exemplary system 10, the rightmost slot in each rack 13' or 13" contains a backup module 22' or 22", which enables one of the programmable controllers to actively operate the machine being controlled and the other controller to act as a backup system and take control when the active controller malfunctions. The backup modules in the two programmable controllers 12' and 12" are connected by cables 21 and 23. The remaining locations in racks are empty and the slots are covered by blank plates until additional functional modules are to be inserted in those slots.

The remote I/O scanner modules 20' and 20" interface the respective controller 12 to external remote I/O racks 24 via a shared serial data link 15. Each remote I/O rack 24 has a plurality of I/O modules 25 which are coupled to individual sensors and actuators on the machine (not shown) being controlled. The I/O modules 25 may take many forms which provide D.C. inputs or outputs, A.C. inputs or outputs, analog inputs or outputs, and open or closed loop positioning modules, for example. The I/O racks 24 and serial network 15 employ conventional interface and communication technology. Each remote I/O rack 24 also contains an adapter module 26, such as the one described in U.S. Pat. No. 4,413,319, which controls the transmission of data via the I/O network 15 between the I/O modules 25 and the scanner modules 20.

The resource manager module 17' of the first programmable controller 12' is connected by a cable to a programming terminal 16. Terminal 16 is a personal computer programmed to enable the user to develop the control programs, which then are loaded into the programmable controller. The terminal also is used to configure the programmable controller and monitor system performance. Once the programs have been loaded into the first programmable controller 12' and their operation debugged, the terminal 16 may be disconnected from the resource manager module 17' if operational monitoring is not required. The terminal 16 can also be connected to the resource manager module 17" of the second programmable controller 12".

Typically the resource manager modules 17' and 17" are connected to a local area network (not shown) over which data and programming instructions can be received and status information and performance data sent to a host computer. This enables a host computer or central terminal to program and control the operation of both programmable controllers 12' and 12".

Figure 2:
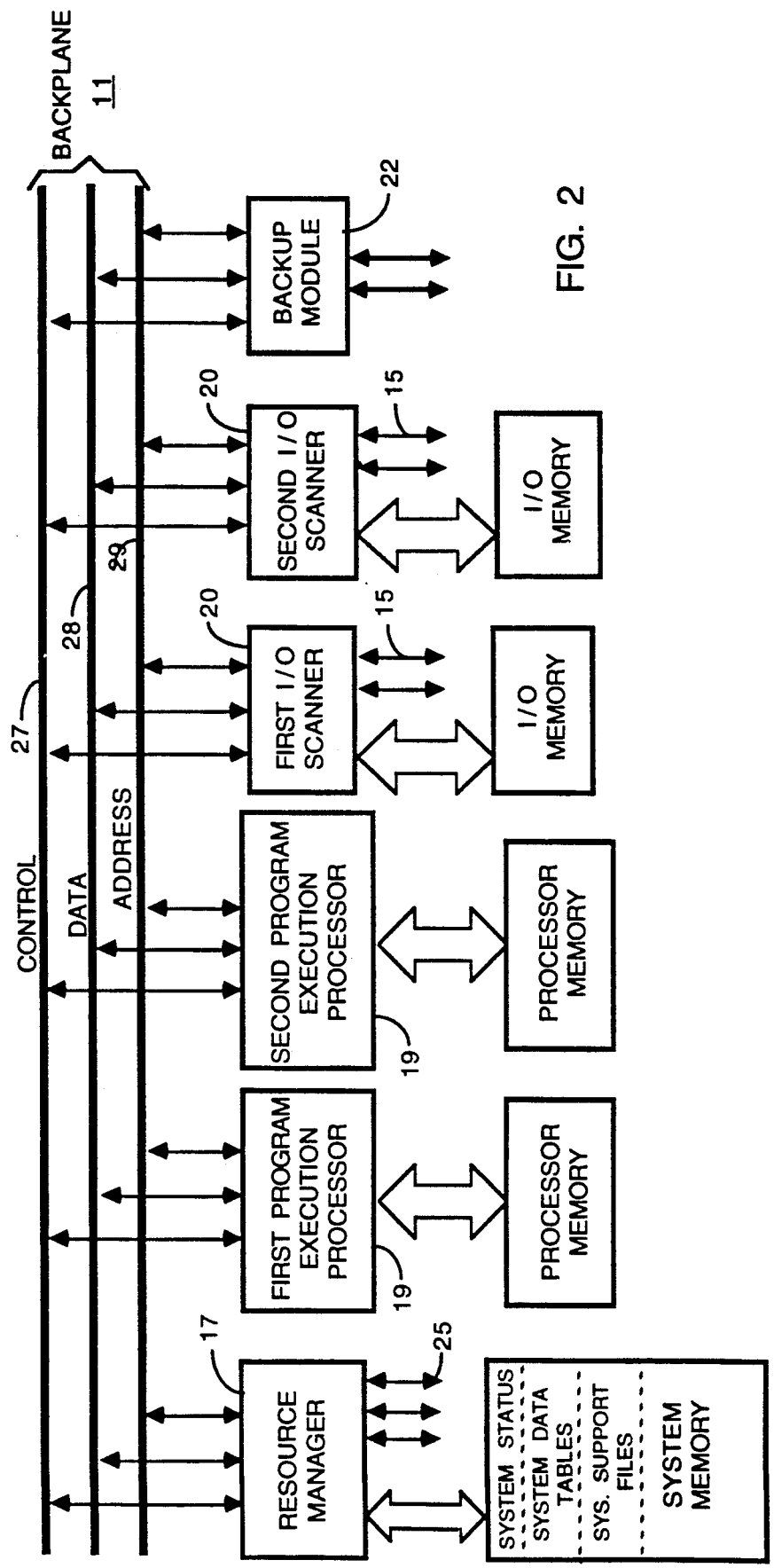
FIG. 2 is a schematic diagram of the interconnection of functional modules in each programmable controller.

With reference to FIG. 2, the backplane of the programmable controller rack 13 has a set of control lines 27, a parallel data bus 28 and a parallel address bus 29. The functional modules 17-22 in the programmable controller rack 13 connect to the control lines and buses 27-29 for the exchange of data and control signals between modules. The modules have localized memory for the storage of data required by that module. The resource manager module 17 has a memory for the storage of status information and configuration data which is accessible by the other modules via the backplane 11.

RESOURCE MANAGER MODULE

Figure 3:
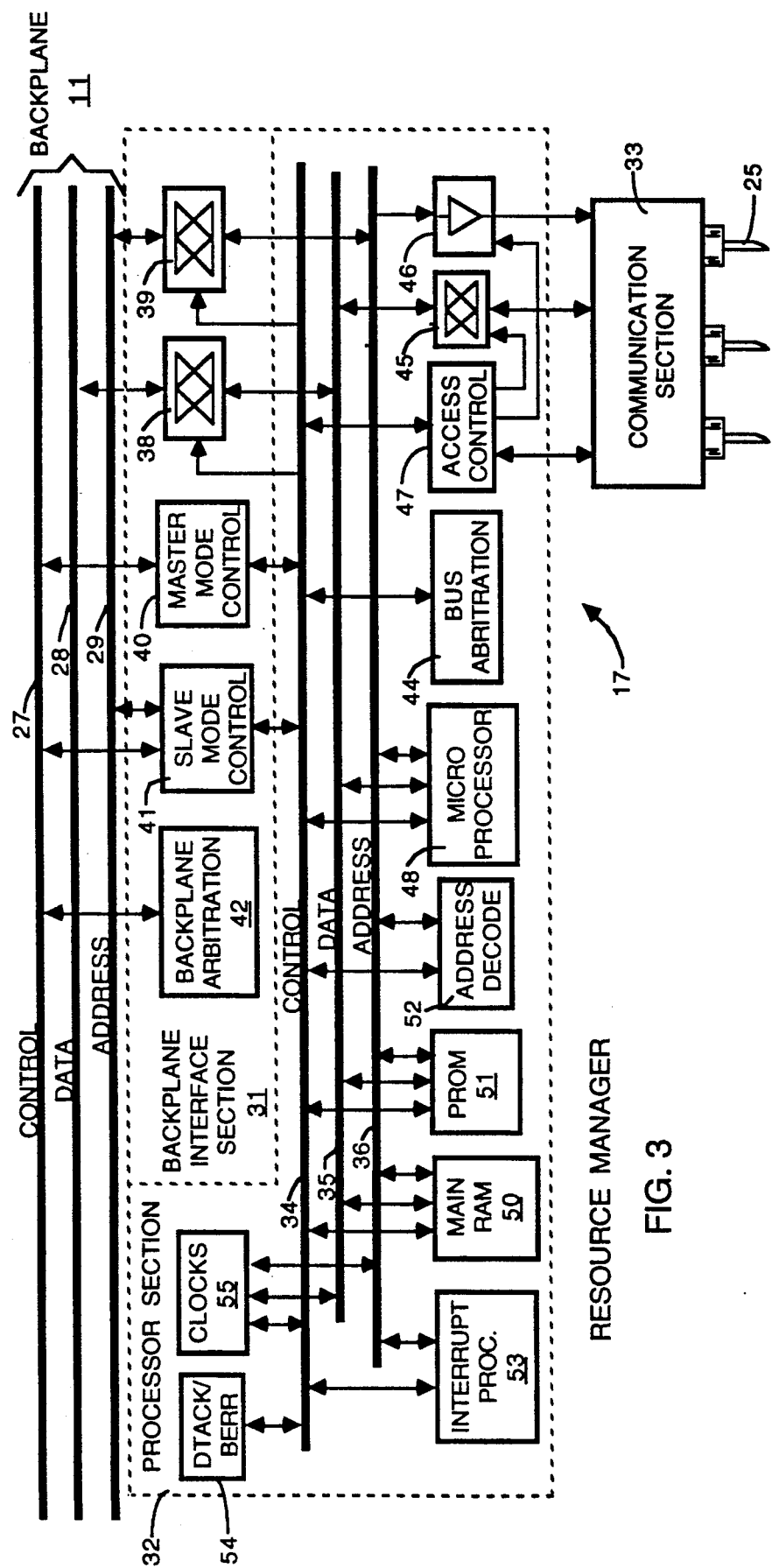
FIG. 3 is a schematic diagram of a resource manager module in each programmable controller.

The circuitry of the resource manager modules 17' and 17" is shown schematically in FIG. 3 and is divided into three sections 31, 32 and 33 for backplane interface, processing and communication functions. The backplane interface section 31 supervises access to the rack backplane 11 by all the rack modules and connects the resource manager module 17 to the backplane. The processor section 32 executes a supervisory program for the control system 10 and the communication section 33 is primarily responsible for communicating with the external terminal 16 and local area networks.

The processor section 32 is linked together by a set of buses that comprise control lines 34, a sixteen bit wide data bus 35 and a parallel address bus 36. The backplane interface section 31 interfaces the processor section buses 34-36 to the backplane buses 27-29. Specifically, the backplane data bus 28 is connected to the processor section data bus 35 by a set of bidirectional data transmission gates 38 and the backplane address bus 29 is connected to the processor section address bus 36 by another set of bidirectional gates 39. When the resource manager module 17 seeks to exercise control over the backplane 11, a master mode control circuit 40 responds to signals on the control lines of the processor section bus 34 and issues the proper control signals over the backplane control bus 27 to access other modules within the rack.

When another module within the rack 13 seeks access to the resource manager module 17, the resource manager module becomes subordinate to the control of the backplane 11 by that other module. In this circumstance, a slave mode control circuit 41 within the resource manager module 17 responds to signals carried on the backplane address bus 29 and on the control lines of the backplane bus 27 which lead from the other module. The slave mode control 41 responds by issuing signals to transmission gates 38 and 39 enabling the other backplane module to access the resource manager module 17. In this latter instance, the master mode control circuit 40 is in a dormant state. The two bus gates 38 and 39 receive enabling control signals from the master or slave mode control circuits 40 and 41 via the lines of control bus 34 depending upon the mode of backplane communication. A conventional backplane arbitration circuit 42 supervises access to the backplane 11 and resolves conflicting requests for access from the modules in the system.

Another arbitration circuit 44 governs access to the processor section buses 34-36. Two sets of signal gates 45 and 46 extend between the processor section buses 35 and 36 and communication section. Specifically, the first set of gates 45 provides a bidirectional data connection between these sections and the second set of gates 46 provides a path for the address signals. An access control circuit 47 responds to access request signals from the processor and communication sections 32 and 33 by enabling the data and address gates 45 and 46.

The processor section 32 is built around a sixteen bit microprocessor 48 which executes program instructions stored in a programmable read only memory (PROM) 51. The microprocessor 48 is essentially a memory mapped device and does not have any input/output lines directly connected to it. Therefore, its access to other components on the processor bus must be accomplished through issuing addresses on bus 36. The address sent from the microprocessor 48 is decoded in an address decode circuit 52 to produce the proper control signals for the accessed component via control bus 34. The processor section 32 also contains an interrupt processor 53 which controls interrupts to the microprocessor 48.

A data transfer acknowledge and bus error (DTACK/BERR) circuit 54 is also connected to the processor control bus 34. Circuit 54 responds to signals from the various components in the processor section 32 to acknowledge the completion of a data transfer and issue bus error signals in the event of improper addressing or failure of data transfer. These signals are acted on by the microprocessor 48 to take corrective action. The processor section 32 also includes clock circuit 55 that contains the main system clock and a real time clock.

The main random access memory (RAM) 50 for the resource manager module 17 is also connected to the processor buses 35-36. The RAM 50 is a memory containing memory locations which are sixteen bits wide, and serves as the system memory for the entire programmable controller 12. The system RAM 50 can be directly accessed via the backplane 11 by other modules in the rack without the intervention of the microprocessor 48 within the resource manager module 17. The main RAM 50 stores configuration data provided by the user via terminal 16, as well as other data that is shared by several functional modules.

FIG. 4 illustrates the data structures within the main system memory 50 of the resource manager module 17. The main system memory 50 stores separate data files, which contain data for performing specific functions during the operation of the programmable controller. The data structures include various forms of data such as integers, floating point numbers, ASCII characters, and various control structures. The first file 61 is a directory of the other files stored in the main system memory 50. The remaining memory is divided into a system status file 62, system data table 63 and a set of system support files 64.

The system status file 62 contains data relating to the configuration of the entire programmable controller 12. Included in this file is information identifying the various user selectable features of the programmable controller that have been enabled by the system operator. The real time clock data regarding the time of day, month, day and year are also included in this portion of the system memory. Digital words indicating the occurrence and type of various system faults and errors, as well as pointers indicating the program instruction being executed when the fault occurs are stored within another sub-file of this section. A section of the system status file 62 also lists the number and type of all the active modules on the system as well as the relative module number and address pointers necessary to access each module. For example, if more than one program processor module 19 or remote I/O scanner module 20 is present in rack 13, the user must assign a unique number by a thumb wheel on the module to distinguish the various modules of that type. The thumb wheel setting is read by the resource manager module during initial start-up of the system and stored in this portion of the system status file 62.

The system data table 63 contains data that is shared by more than one module. For example, results of various computations from one processor module 19 may be stored in this portion of the system memory so that other program processor modules may readily access the data. Memory space is allocated within the system data table 63 to store the data that was received or that will be transmitted via the various external communication links of the resource manager module's communication section. Other modules in the rack 13 are directly able to access these storage locations.

The system data table 63 also contains the value of various system counters and variables which are either used by the resource manager module 17 or which are commonly used by a number of other modules such as processor modules 19 or the I/O scanner modules 20. The final sub-file within the system data table 63 is a space allocated for the user defined data for various programs that the user has loaded into the programmable controller.

The final section 64 of the main system memory 50 is dedicated to the system support files. These files include the source program information for the function chart program. The resource manage module 17 does not directly execute the function chart program. However, as will be described later, the function chart is employed during the programming step to generate data which is used to direct the operation of the program execution modules 19. In order to permit the subsequent editing of these programs, a source version of the function chart must be available for display on the programming terminal. As also will be described hereinafter, the support files 64 contain simultaneous counters for execution of various branches of the function chart. Although the local memory in each module contains data regarding its status, in some instances these memories do not have a battery to sustain them. In order to retain such volatile information after a power shut-down, the status information for these modules is replicated in a sub-file of section 64 of the system memory 50.

Communication parameters are also stored in this section 64 for configuring the communication section 33 of the resource manager module 17. Among other things these parameters include baud rate, word size and control bits for the serial data signal format. For example, parameters for communicating with the operator terminal 16 are stored in this portion of the system memory. In addition, as noted previously, a number of programmable controllers may be connected via local area network, in which case, parameters must be provided in each controller instructing them how to communicate over the network.

The communication section 33 interfaces the programmable controller to the serial communication link for the terminal 16 and a local area networks. The communication section includes drivers for serial signal standards, such as RS232, RS423 or RS422.

The resource manager module 17 executes operating system programs which control the initialization of the programmable controller system 10 and the external communication interface. The resource manager module 17 does not execute the user defined control program which operates the equipment being controlled. That is the function of the processor module or modules.

PROGRAM EXECUTION PROCESSOR

The program execution processor modules 19 store and execute specific user control programs, such as ladder programs. One of these modules is shown schematically in FIG. 5. During this execution, the modules 19 read the state of the sensing devices from input image table in the memory of the various I/O scanner modules 20, and write output data from its memory to the output image tables in the I/O scanner modules. Data is also obtained from the system memory 50 in the resource manager module 17.

In order to perform these tasks, each processor module 19 has a set of internal buses 71-73 which are coupled to the backplane 11. Specifically, the processor module 19 has a thirty-two bit internal data bus 72, a set of control lines 71 and an address bus 73. These are coupled to the data and address buses of the backplane 11 by respective set of tri-state, bidirectional transmission gates 74 and 76. The operation of these gates 74 and 76 is governed by an interbus control circuit 75 coupled to backplane control lines 27 and the module control lines 71.

The remaining components of the processor module 19 are connected to the internal buses 71-73. These internal buses are connected to a microprocessor 78, which has an interrupt port which is coupled to an interrupt interface circuit 79. This interface circuit receives signals from four external interrupt lines connected to terminals on the front of the processor module 19 and from circuits within the processor module 19. A signal on any of these external or internal interrupt lines causes the microprocessor to immediately interrupt normal program execution and execute a routine that corresponds to that interrupt line.

The processing capability of the processor module 19 is also supported by a floating point math co-processor 80, and by a bit co-processor 82. The bit co-processor 82 is a custom integrated circuit for carrying out Boolean logic operations on individual bits of the data words. Bit co-processors have been used in programmable controllers in the past to execute a set of ladder diagram instructions using hardwired logic as described in U.S. Pat. No. 4,742,443 entitled "Programmable Controller with Function Chart Interpreter".

The three processor circuits 78, 80 and 82 cooperate to execute specific types of instructions included in the control program. The microprocessor 78 may begin execution of the control program and when it encounters a floating point arithmetic function, the floating point co-processor 80 is enabled to take over the processing function until the arithmetic operation is complete at which time the microprocessor 78 resumes program execution. If the control program calls for single data bit processing, the microprocessor immediately relinquishes control to the bit co-processor 82 by writing the address of the control program instruction into a program counter in the bit co-processor. The bit co-processor 82 then removes the microprocessor 78 from the internal buses 71-73 and executes the subsequent control program instructions until a stop instruction is encountered. At this point the bit co-processor 82 signals the microprocessor 78 via the control bus 71 to resume control of the buses and execution of the control program. Approximately 85-90 percent of a typical control program of the "ladder" type may be executed by the bit co-processor 82. The operation of the bit co-processor in conjunction with a microprocessor is fully described in the U.S. patent cited immediately above.

Both a read only memory (ROM) 84 and a read-write random access memory (RAM) 85 are connected to all three internal buses 71-73 within the processor module 19. The ROM 84 contains storage locations for instructions and constants for the three processor circuits 78, 80 and 82. The RAM 85 provides storage for the operands and the results of the various computations performed by the processor module 19. The user defined control programs to be executed by the module 19 are also contained in its RAM 85.

FIG. 6 represents the data structure of the RAM processor module 19. The memory 85 includes a section 90 which contains status information regarding the module's operation. Each program execution processor module 19 also contains its own data table 91 which is stored in the RAM 85. The data table 91 includes memory locations for various counters, timers and intermediate computation values. The largest share of the RAM 85 is devoted to storing the control programs. The programs comprise compiled control programs, independent background tasks and various interrupt routines to be run by the processor modules 19. To properly carry out the control programs, support files containing the function chart data, called "descriptors," are also contained within the program area 92. In one mode of operation of the program execution processor module 19, referred to herein as the "synchronous mode", the processor module 19 periodically copies the entire input image table from the I/O scanner modules 20 into its own memory 85. Space for this copy of the I/O image table is provided in memory section 93.

The final component of the processor module 19 is a control and status circuit 88 which monitors the status of the processor module and provides proper control signals on various lines of the control bus 71 to enable various components in a conventional manner. As noted, the I/O scanner modules 20 handle the transfer of data from the processor modules 19 to the I/O modules 25 in the remote I/O racks 24.

REMOTE I/O SCANNER MODULE

Referring to FIGS. 1 and 2, a remote I/O scanner module 20 couples the programmable controller 12 to one or more remote input/output racks 24 containing individual I/O modules 25 which interface the sensors, or input devices, and actuators, or output devices, to the programmable controller. Each scanner module 20 periodically requests input data pertaining to the status of the input devices connected to the remote I/O racks 24 and stores it in the module's input image table for reading by other controller modules, such as the processor modules 19. The scanner module 20 also contains an image table of output data that it receives from other controller modules, such as the processor modules 19. At regular intervals, the updated output data in the scanner module's output image table is transferred to the respective remote input/output racks 24 to control the various actuators connected to these racks.

Figure 7:
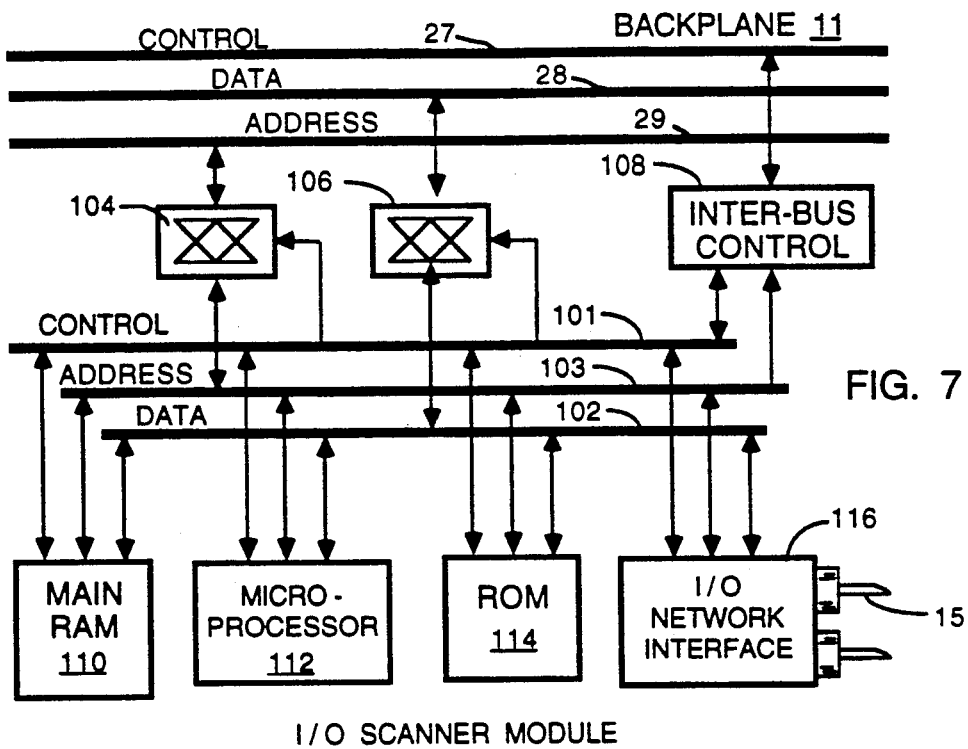
FIG. 7 is a schematic diagram of a remote I/O scanner module in each programmable controller.

Referring specifically to FIG. 7, each remote I/O scanner module 20 connects to the three backplane buses 27-29. The I/O scanner 20 contains a set of internal buses 101-103 connected to the backplane 11 by a set of address bus gates 104 and a set of data bus gates 106. Both of these transmission gates are controlled by an inter-bus control circuit 108 which sends signals to the gates 104 and 106 via the control bus 101. A local random access memory, referred to as RAM 110, is coupled to the three internal buses 101-103. This memory stores the input image table for the sensor information being input to the I/O scanner 20 from the remote I/O racks 24 and also stores the output image table for the output data being output to the remote I/O racks.

The microprocessor 112 in the I/O scanner module 20 executes a firmware program stored in a ROM 114. This program periodically accesses each I/O remote rack 24 to gather the status data from the associated input devices and send output data to the rack. The data is exchanged through an I/O network interface circuit 116 which is connected to buses 101-103 in the scanner module 20. The interface circuit 116 handles the electrical interface between the parallel data format of the module and the serial data transmission protocol of the I/O data link 15. Two such links 15 can be connected to a single I/O scanner module 20.

The structure of the programmable controller 12 described thus far is similar to that described in U.S. Pat. No. 4,858,101. That document also describes in detail how the controller is programmed by the user and how the user defined control program is executed to govern the operation of machinery. This earlier programmable controller did not have a mechanism by which a second controller could be used for backup in case of a malfunction of the primary controller.

BACKUP MODULE HARDWARE

As shown in FIG. 1, the two programmable controllers 12' and 12" contain identical backup modules 22' and 22", respectively, which are connected by a serial communication link 21 and a control cable 23. The function of this module will be described in terms of the operation of the backup module 22' in the first programmable controller 12'.

Figure 8:
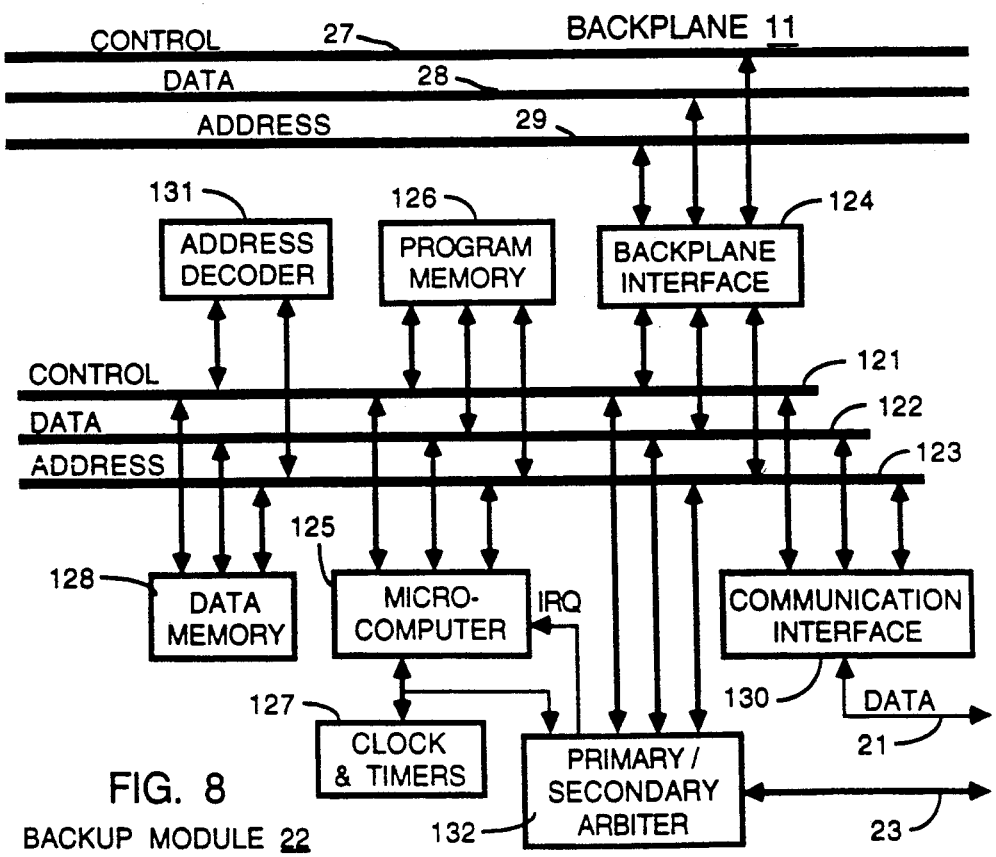
FIG. 8 is a schematic diagram of a backup module in each programmable controller.

With reference to FIG. 8, the backup module 22' is connected to the three buses 27-29 of the rack backplane 11 by a backplane interface circuit 124 which consists of two sets of bi-directional data buffers for the address and data buses and an interbus control circuit connected to the control lines of each set of buses. These components of the interface circuit 124 are similar to the devices by which the previously described modules connect to the backplane.

The backplane interface circuit 124 is connected to a control bus 121 and internal data bus 122 and an internal address bus 123 within the backup module 22. The backup module contains a microcomputer 125 which executes a program stored within a memory 126 that governs the operation of the backup module as will be described. Alternatively the program memory 126 can be connected to the microcomputer 125 by a separate bus. Data which is used in the course of the backup module operation and additional data that are exchanged with the other backup modules are stored within a data memory 128. The microcomputer 125 and the program and data memories 126 and 128 are connected to the internal buses 121-123. The microcomputer also is connected to a clock and timer circuit 127.

The serial data communication link 21 between the two backup modules 22' and 22" is connected to a communication interface circuit 130 that in turn is connected to the three internal buses 121-123 within the module. For example, the data communication link 121 conforms to the IEEE 802.4 standard communication protocol and has conventional circuitry for communicating via that protocol. As will be described, the microcomputer 125 periodically gathers data from other modules within the programmable controller 12 and stores the data temporarily in data memory 128. That data then is transmitted as a message over the serial communication link 21 by the microcomputer 125 transferring the data from the memory into the communication interface 130.

In a similar fashion, the backup module 22" at the other end of the serial communication link 21 receives the message and its microcomputer 125 obtains the message data from the communication interface 130 and stores it temporarily in data memory 128. After the entire message is received, the microcomputer 125 forwards the data from the memory 128 via backplane interface 124 and the backplane 11 to a particular functional module within the rack 13 depending on the type of data. Such data may comprise system control information which is forwarded to the resource manager module 17, or I/O image table data which is sent to a specific I/O scanner module 20 within the recipient programmable controller 12.

The two backup modules 22' and 22" also are connected by a control cable 23 through which signals are exchanged to determine which of the two programmable controllers 12' or 12" is to be the primary controller, operating in an active mode, and which is to be the secondary device, operating in a backup mode. The control cable 23 couples to a primary/secondary arbiter 132 that is connected to the microcomputer 125 via buses 121-123. As will be described in detail, interrupt and other control lines also extend directly between the primary/secondary arbiter 132 and the microcomputer 125 within the backup module 22.

Figure 9:
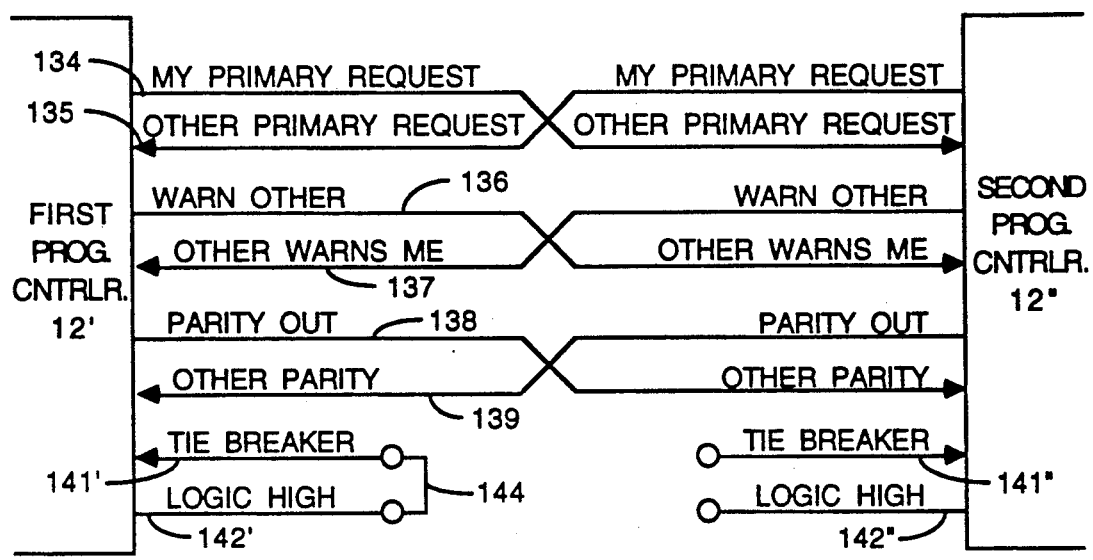
FIG. 9 is a schematic diagram of the connections between the backup modules in each programmable controller.

The conductors of the control cable 23 are illustrated in FIG. 9. A first pair of conductors 134 and 135 are utilized upon system initialization or reset to determine which of the two programmable controllers 12' and 12" is to become the active and the backup device. The first programmable controller 12' originates a signal designated MY PRIMARY REQUEST which is applied to a first conductor 134 of the cable. This signal indicates that the first programmable controller is requesting to operate in the active mode and becomes an input signal at the second programmable controller 12" that is designated OTHER PRIMARY REQUEST. A second conductor 135 of the control cable 23 carries a similar request to be the active, or primary, device from the second programmable controller 12" to the first programmable controller 12'. After initialization only the programmable controller which becomes the primary device and actively controls the machine, will continue to assert a MY PRIMARY REQUEST signal. Thereafter, that primary controller will stop asserting that signal to indicate a malfunction to the backup controller.

Another conductor 136 carries a warning signal which indicates that the first programmable controller 12' suspects that the second programmable controller 12" is malfunctioning. This WARN OTHER signal from the first programmable controller 12' becomes an input signal designated OTHER WARNS ME at the second controller 12". Conductor 137 carries a similar warning signal from the second programmable controller 12" to the first device 12'.

The parity of control signals exchanged between the programmable controllers 12' and 12" are indicated by a pair of PARITY CHECK signals carried in opposite directions by conductors 138 and 139.

The present backup technique allows either of the two programmable controllers 12' or 12" to become the primary device actively controlling the machine. As will be described in detail, an arbitration technique is utilized to determine which of the programmable controllers will operate in the active mode. It is conceivable that this arbitration process could result in a tie. In order to break the tie, each programmable controller has an input 141 designated TIE BREAKER and a control cable terminal 142 that is pulled up to a high logic level. One end of the control cable 23 has a connector with a jumper 144 between contacts for terminal 142 and input 141. The connector at the other end of the cable does not have such a jumper. When a tie occurs, the controller 12, with the jumper 144 at its TIE BREAKER input 141, normally enters the active controlling mode and the other programmable controller without the jumper at its connector usually enters the backup mode, assuming both controllers are properly operating. This arbitration to determine which of the two programmable controllers 12' or 12" is to operate in the active mode is performed by the primary/secondary arbiters 132 in their backup modules 22.

With reference to FIG. 10, the primary/secondary arbiter 132 is built around a state machine 150 comprising commercially available programmable logic array. The operation of the state machine 150 will be apparent to those skilled in the art based on the state machine diagram of FIG. 11, as well as description of the various states of operation for the arbiter and the events which cause a transition to occur from one state to another. The state machine is connected to an external timer circuit 152. The arbiter 132 also receives indications when the backup module 22 is resetting and when a system fault has occurred, as indicated by input signals on lines 153 and 154 from control bus 121 of the backup module. These control lines 153 and 154 are connected to the inputs of an OR gate 155 having an output coupled to an input of the state machine 150. The state machine also produces an signal designated SWITCHOVER INTERRUPT which is connected directly to an interrupt input (IRQ) of the microcomputer 125 in FIG. 8. The interrupt signal indicates to the microcomputer that its programmable controller should become the primary device.

A backup module data bus 122 is connected to a set of latches 156 which responds to a control signal designated CPU WRITE by storing data from the microcomputer 125 carried by bus 122. The CPU WRITE signal is produced by the address decoder 131 receiving the address of the data latches 156 from the microcomputer. One data bit stored in the latches 156 indicates when the backup module 22 is READY to function; another bit indicates when the backup module is in a state where the controller 12 is qualified to operate as a secondary, or backup, device; and a third bit indicates that the microcomputer 125 wants the state machine 150 to clear the SWITCHOVER INTERRUPT signal. These bits produce three signals on output lines from the data latches 156 which are connected to inputs of the state machine 150. Another output bit from the data latches 156 produces the WARN OTHER signal which is applied to the control cable 23 to signal a suspected malfunction of the other programmable controller. A final data bit from the set of latches 156 is stored by the microcomputer 125 to clear a CABLE ERROR signal produced when a parity error is detected in the signals on control cable 23, as will be described.

These five output signals from the data latches 156 are connected to separate inputs of a first set of tri-state data buffers 158 which have outputs connected to the backup module data bus 122. The data buffers 158 are enabled by a signal designated CPU READ which is received by the arbiter 132 over the control bus 121 from the address decoder 131. The CPU READ signal also enables a second set of tri-state data buffers 160 having inputs connected to outputs of the state machine 150 which indicate the CURRENT STATE of that component. The output from the second set of data buffers 160 also are connected to the module data bus 122.

The state machine 150 has an output that is connected by a signal buffer 161 to a terminal for the control cable 23 to produce the MY PRIMARY REQUEST signal. Another conductor of the control cable 23 is connected by a second signal buffer 162 to an input of the state machine 150 to couple the OTHER PRIMARY REQUEST signal to the state machine. The control cable conductor 136 which carries the OTHER WARNS ME signal is coupled via a third signal buffer 163 to yet another input of the state machine 150. The TIE BREAKER signal on conductor 141 of the control cable 23 is applied to an input terminal of a fourth signal buffer 164 which has an output connected to an input of the state machine 150. A fifth signal buffer 165 produces the high logic level signal at an output terminal to which the cable conductor 142 is connected.

The signals from the outputs of buffers 163 and 164 which are designated OTHER WARNS ME and TIE BREAKER, respectively, are connected to a pair of data latches 166. When data latches 166 are enabled by the module clock signal store the level of the respective signals. The output of these data latches 166 are connected to selected inputs of the first set of tri-state data buffers 158.

The outputs of the second and third signal buffers 162 and 163, designated the OTHER PRIMARY REQUEST and the OTHER WARNS ME signals, are applied to inputs of a cable error circuit 168. In addition, the outputs of the data latches 156, which are designated as the WARN OTHER and CLEAR CABLE ERROR signals, are also applied to inputs of the cable error circuit 168. Thus, the cable error circuit has as inputs the two signals from signal buffers 162 and 163 which are received via the control cable 23 from the other. programmable controller 12. As will be described, the cable error circuit 168 computes the parity of these two signals and compares it to the OTHER PARITY signal received on line 139 of the control cable. If the two parity values are not identical, a CABLE ERROR signal is sent to an input of one of the data buffers 158 and onto the data bus when the buffers are enabled by the CPU READ signal. The cable error circuit 168 also receives signals applied to cable 23 by other components of the arbiter 132 in order to send a parity bit on line 138 of the cable.

BACKUP MODULE OPERATION

The backup modules 22' and 22" in each programmable controller 12' and 12" exchange signals over the control cable 23 upon being powered up and whenever a reset occurs in order to determine which controller will be the primary device that controls the machine. Referring to FIG. 10, the state machine 150 in the backup module determines whether its programmable controller will be the primary or the secondary device, and thereby operate in the active or backup mode respectively. This determination is made according to the state diagram illustrated in FIG. 11. The operation of the backup module 22' in the first programmable controller 12' will be described, with the understanding that the other backup module 22" operates in the same manner. The only operational difference is the breaking of a tie when both controllers seek primary status, as will be described.

Upon a reset or a system fault occurring in the programmable controller 12, the primary/secondary arbiter 132 receives a corresponding signal on either input line 153 or 154 and applies the signal through OR gate 155 to an input of the state machine. When either of these signals is active, the state machine enters the start state 170, depicted in FIG. 11 regardless of its previous state. The state machine stays in this state until the microcomputer 125 has completed its initialization and stored a bit within latches 156 of the arbiter 132 which produces an active READY input signal to the state machine. It should be noted that when the microcomputer stores this bit in the latches 156 or upon a system reset, the remaining latches are reset to produce inactive signals on the other output lines. By that time, the RESET or SYSTEM FAULT signal which triggered the restart of the state machine should have gone inactive. If either of these signals goes active again or the READY signal disappears while the state machine is in any state except the controlling state 176, an automatic transition will occur to the start state 170.

Once the READY signal has been received and the RESET and SYSTEM FAULT signals have gone inactive, the state machine makes a transition to step 171 where a check is made to determine whether the other programmable controller (PC) is seeking to become the primary device. Such a determination is made by inspecting the input line to the state machine which is coupled to the control cable conductor 135 that carries the OTHER PRIMARY REQUEST input signal. Assume initially that the OTHER PRIMARY REQUEST signal is inactive as occurs when either there is not another programmable controller 12" or when the backup module 22" in the other controller 12" has yet to request to become the primary device. In this situation, the state machine 150 will continue to advance to the assert primary request state 172 where it will send the MY PRIMARY REQUEST signal onto the control cable 23. To do so, the state machine produces an output signal at the input of the first signal buffer 161 to produce an active request signal on cable conductor 134. After asserting the MY PRIMARY REQUEST signal, the state machine initializes timer 152 for a given interval and advances to state 173 to await the expiration of that timer. The timer 152 provides a delay for at least the time it takes for signals to propagate through the control cable 23 in case the other programmable controller 12' also is sending a request to become the primary device.

At the expiration of the timer 152, the state machine 150 enters the resolve conflict state 174 where the input from line 135 which carries the OTHER PRIMARY REQUEST signal is sampled again to insure that the other programmable controller 12" is not attempting to become the primary device. Assuming that only the first controller 12' is seeking to become the primary device, its state machine 150 will advance to the controlling state 176. This advancement is signaled to the backup module microcomputer 125 via buffer 160. The microcomputer then signals other modules in the first programmable controller 12' to enter the active mode and begin executing the control program to exchange data with the remote I/O racks 24. The execution of the control program is described in detail in U.S. Pat. No. 4,858,101. Thus, the first programmable controller 12' becomes the primary device exerting control over the machinery.

In the controlling state, the backup module 22' periodically gathers I/O and status data and transmits the data over the serial communication link 21 to the secondary programmable controller. Specifically, at regular intervals a timer within component 127 of the backup module in FIG. 8 times out and signals the microcomputer 125. The microcomputer responds by executing a data gathering and transmission routine that is stored in the program memory 126. This routine causes the microcomputer 125 to sequentially access each I/O scanner module 20' in the same rack 13' as the backup module 22'. As each I/O scanner module 20' is accessed, the contents of its I/O data table are sent via the backplane 11' to the backup module data memory 128. Then the backup module 22' also accesses the resource manager module 17' to obtain the system status information and system data table from memory 50 in a similar manner. Data tables in the program processor modules 19' also are read and stored in the backup module 22'.

As different segments of this data are acquired by the backup module 22' and stored in data memory 128, the module's microcomputer 125 begins transferring it over data bus 122 to the communication interface 130. This latter component formulates a message containing the data according to the protocol of the serial communication link 21. The formulated message is transmitted over the link.

The message is received at the backup module 22" of the second programmable controller 12". Typically at this time, the recipient backup module 22" is in the qualified secondary state, unless this is the first data transfer following a reset of the recipient module. In that state, the data received via link 21 is transferred by microcomputer 125 of second backup module 22" from the communication interface to its data memory 128. As the recipient receives each segment of data, its backup module microcomputer 125" transfers the data over the backplane 11" in the second programmable controller 12" to the appropriate modules 17", 19" and 20". Through this transfer of data, the second programmable controller 12", operating in the backup mode, has a relatively up to date copy of the operational data so that it can assume control of the system in the event of a failure of the primary controller 12'. It should be understood that when the second programmable controller 12" is functioning in the active mode as the primary device, its operational data is transferred to the first programmable controller 12' which now is functioning in the backup mode as the secondary device.

The state machine 150 in the primary controller (e.g. first programmable controller 12') remains in the controlling state 176 until a RESET or SYSTEM FAULT signal is asserted, or the READY signal from data latches 156 is negated. Should either of these conditions occur, the state machine enters a filter state 178 from the controlling state 176 rather than returning immediately to the start state 170 as happens when either of these signals occurs while in any of the other states. The filter state 178 prevents the levels of the READY, RESET or SYSTEM FAULT signals from changing momentarily due to noise spikes and causing the state machine to erroneously leave the controlling state. Advancing to the filter state does not cause the state machine to negate the MY PRIMARY REQUEST signal, nor cease operating the controlled machine. If either of the RESET or FAULT signals continues to be active, or the READY signal still is negated after one clock cycle, the state machine 150 makes a transition from the filter state 178 to the start state 170. Otherwise, the state machine returns from the filter state 178 to the controlling state 176.

Assume now that when the first programmable controller 12' being described comes on line, the second programmable controller 12" already has asserted its MY PRIMARY REQUEST signal. This signal becomes the OTHER PRIMARY REQUEST input signal from cable conductor 135 at the first controller 12'. Thus when the state machine 150 in the first programmable controller 12' advances from the start state 170 to the check other PC state 171, it will sense an active OTHER PRIMARY REQUEST signal. This causes the state machine to advance to step 180 which is designated disqualified secondary. If the second programmable controller 12" is not purposely disqualifying the first controller 12' from becoming a secondary, as evidenced by the receipt of an active OTHER WARNS ME signal, the present state machine 150 jumps to the secondary standby state 182.

The microcomputer 125 in this latter state 182, as directed by firmware stored within the program memory 126, indicates that it is ready to assume the responsibilities of a qualified secondary device by storing a bit within the first set of latches 156 to send an active QUALIFY SECONDARY input signal to the state machine 150. The state machine remains in the secondary standby state 182 until it receives that QUALIFY SECONDARY signal. If at any time while in state 182, the OTHER WARNS ME signal goes active, the state machine 150 returns to the disqualified secondary state 180. The OTHER WARNS ME signal is produced by another programmable controller and transmitted via the control cable 23 when that other device believes the present programmable controller is in a fault condition or is not operating properly.

When the state machine receives an active QUALIFY SECONDARY signal while in the secondary standby state 182, a transition occurs to the qualified secondary state 184 where it remains until it is either disqualified by an active OTHER WARNS ME signal or by the QUALIFY SECONDARY signal going inactive. A programmable controller is in the backup mode when the backup module indicates the qualified secondary state.

A programmable controller in the backup mode is in a position to assume control of the machine should the primary programmable controller malfunction. A malfunction is indicated by the OTHER PRIMARY REQUEST signal from the primary controller going inactive. The state machine 150 in the secondary primary controller detects this event and responds by entering the generate interrupt state 186. When this occurs, the state machine 150 sends an active SWITCHOVER INTERRUPT signal to the interrupt input (IRQ) of the microcomputer 125 in FIG. 8. This interrupt signal remains asserted until reset by a CLEAR INTERRUPT signal produced by the microcomputer 125 storing an appropriate bit in data latches 156 or by an active RESET or FAULT input signal on line 153 or 154. Assuming that the QUALIFY SECONDARY signal from the data latch is still active and the OTHER PRIMARY REQUEST input signal on line 135 of the control cable 23 still is inactive, the state machine 150 will advance from the generate interrupt state 186 to the controlling state 176.

The generate interrupt state 186 serves as a filter should the negation of the OTHER PRIMARY REQUEST signal have been caused by noise. While in the generate interrupt state 186 should the OTHER PRIMARY REQUEST signal on line 135 of the control cable again become active, the state machine 150 will return to the qualified secondary state 184. In this event, the microcomputer 125 detects the state change by reading the second set of data buffers 160 and responds by disregarding and clearing the the SWITCHOVER INTERRUPT. To clear the interrupt, the microcomputer 125 sends a bit to the appropriate data latch in set 156 which sends the CLEAR INTERRUPT signal to the state machine 150. Regardless of the state in which the machine is currently operating, this CLEAR INTERRUPT signal causes the state machine to negate the active SWITCHOVER INTERRUPT signal previously being produced.

The state machine operating in the qualified secondary state 184 will always jump to the start state 170 upon resets, faults and negation of the READY signal by the microcomputer 125. In addition, qualified secondary devices can transfer to the disqualified secondary state 180 in response to the microcomputer 125 or appropriate control signals on cable 23 from the other programmable controller. In the situation where the backup module microcomputer 125 disqualifies it from being a secondary, the QUALIFY SECONDARY signal at the output of data latches 156 simply is removed. This causes the state machine to follow a path through the disqualified secondary state 180 to the secondary standby state 182. When the microcomputer 125 subsequently determines that the programmable controller can become a qualified secondary again, the QUALIFY SECONDARY signal is reapplied to the state machine 150 by storing an active bit in the appropriate data latch within set 156. This action causes the state machine to return to the qualified secondary state 184.

When a programmable controller functioning as the secondary receives the OTHER WARNS ME signal on cable conductor 136, its state machine 150 transfers from the qualified secondary state 184 to the disqualified state 180. In order to become qualified again, the other programmable controller removes the active OTHER WARNS ME signal and the present backup module's microcomputer 125 must negate and then reassert the QUALIFY SECONDARY signal. This action causes the state machine 150 to pass through the secondary standby state 182 on the way to the qualified secondary state 184.

It is conceivable that both programmable controllers 12' and 12" may come on-line almost simultaneously, in which case the state machines 150 in their respective backup modules 22' and 22" both proceed to the ASSERT PRIMARY REQUEST state 172, since neither is aware of the other s action in these early stages due to device and signal propagation delay times. Both state machines 150 enter the wait state 173 until their respective timers 152 expire, which will allow enough time for all cable signals to propagate.

Proper configuration dictates that one programmable controller (e.g. device 12' in FIG. 9) has the TIE BREAKER signal input 141' connected to a high logic level and the other programmable controller (e.g. device 12") will have its TIE BREAKER signal input 141" negated by a logic level applied by resistor 167 in FIG. 10. In this example, when the second programmable controller 12" enters the resolve conflict state 174, it will detect that the OTHER PRIMARY REQUEST input signal is asserted and that its TIE BREAKER signal is negated. This will cause the state machine 150 in the second programmable controller 12" to advance to the disqualified secondary state 180, and negate its previously active MY PRIMARY REQUEST signal in the process. From the disqualified secondary state 180, the second programmable controller can advance to the secondary standby and qualified secondary states as previously described. The first programmable controller 12', which has the TIE BREAKER input 141' coupled to a logic high level, will wait in the resolve conflict state 174 until the other controller no longer is seeking to become the primary device, as indicated by an inactive OTHER PRIMARY REQUEST. The first programmable controller then enters the controlling state 176 and becomes the primary device.

Figure 11:
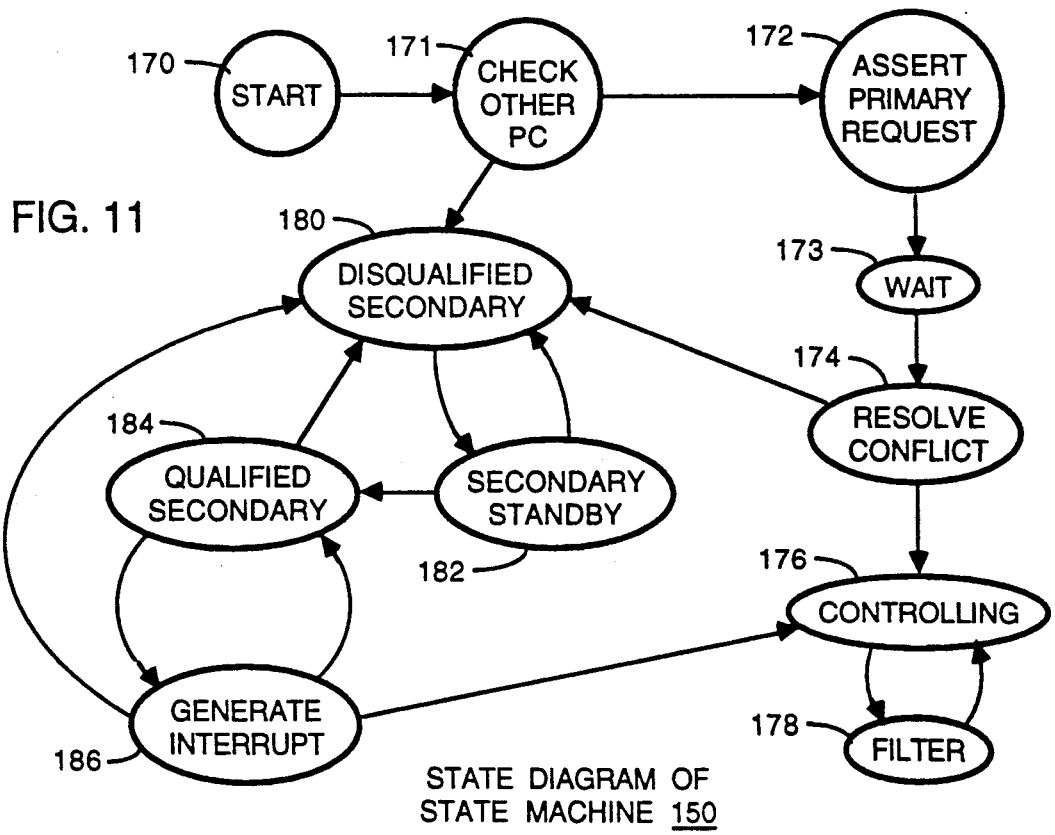
FIG. 11 is a state diagram depicting the operation of the primary/secondary arbiter.

Referring still to FIGS. 10 and 11, there are times when primary-secondary switchovers and switchbacks need to be under the control of the microcomputer 125 within the backup module. Such times include system testing and diagnostic demonstrations in addition to intentional assignment of primary and secondary systems regardless of power-up order. Such control is possible with the state machine configuration, since the present state machine can be reset at any time by the microcomputer 125 negating the READY input signal. The primary controller needs only to negate the READY signal until it enters the start state 170, while the secondary programmable controller is asserting an active MY PRIMARY REQUEST signal which is applied as the OTHER PRIMARY REQUEST input to the former primary controller. Once this occurs, microcomputer 125 in the former primary programmable controller can reassert an active READY signal to force its state machine along a path to the qualified secondary state 184, since the other programmable controller now has switched over to become the new primary.

CABLE ERROR DETECTION

As the state machine 150 sends signals in parallel over the control cable 23 to the other programmable controller, a cable error circuit 168 receives those signals and computes a parity bit which is sent over conductor 138 of the cable. Similarly, a parity bit is received on line 139 from the other programmable controller to indicate the parity of the signals being received by the state machine 150 from that other device. For example, the parity bit can indicate whether an odd or an even number of logical one bits is being sent over the cable in the corresponding direction at any given time. It should be noted, however, that all of the signals carried in both directions by the control cable are asynchronous, thus requiring special handling in order to determine the parity as a given signal may change logic levels before the corresponding parity signal responds. As used herein the term "asynchronous" refers to the fact that the signals being sent in parallel between the two backup modules change logic levels independent of any common time reference.

Figure 12:
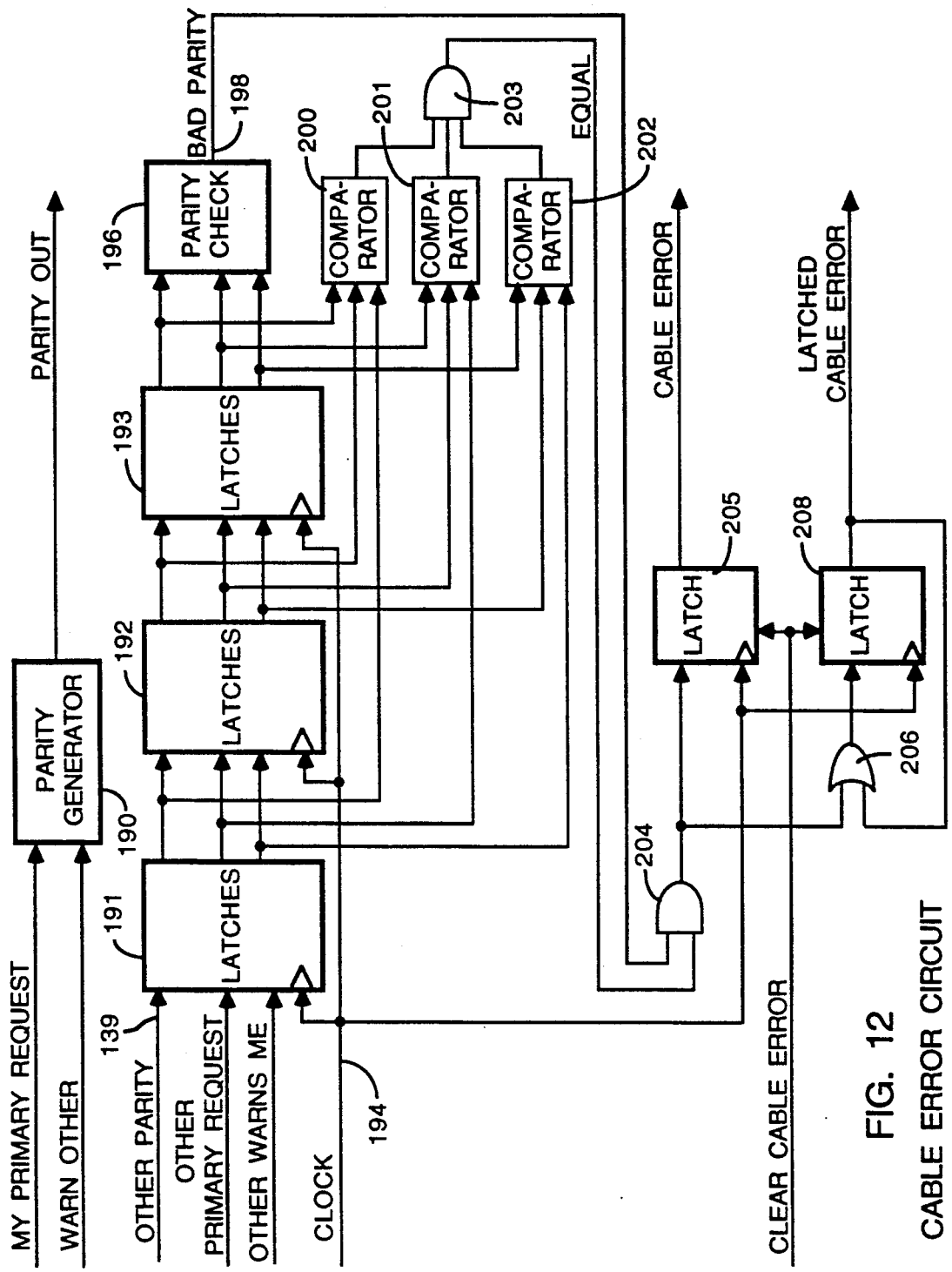
FIG. 12 is a block diagram of the cable error circuit in FIG. 10.

The parity signals are processed by the cable error circuit 168 illustrated in FIG. 12. In order to generate the parity out signal, the output signals from the state machine 150 that are designated MY PRIMARY REQUEST and WARN OTHER are applied as inputs to a standard parity generator 190 which produces a bit on the PARITY OUT line 138 depending upon whether the total number of high logic level bits on the input lines is odd or even. If the state machine or other components of the backup module 22 transmit other signals over the control cable, those other signals may be applied to the parity generator so that the output bit accurately reflects the parity of all of the signals being sent in that direction over the control cable.

A change of the MY PRIMARY REQUEST or the WARN OTHER signal will have been applied to the control cable 23 before a new parity bit is computed and applied to the cable due to propagation delays in the circuitry. Thus the signal on the PARITY OUT line also is asynchronous with respect to the other outgoing signals on the control cable 23. This means that the other backup module will receive the new MY PRIMARY REQUEST or WARN OTHER signal before the new parity bit. If a conventional parity check circuit is incorporated in the other backup module, a parity error signal will be produced as the parity of the incoming signals will not agree with the old parity bit. The present cable error circuit 168 utilizes a unique parity check technique that does not erroneously indicate a cable error in this situation.

The backup module 22 in the other programmable controller 12 has a similar parity generator 190. The parity signal from the other controller is received by the present backup module 22 and applied to the cable error circuit 168 in the primary/secondary arbiter 132. As illustrated in FIG. 12, the OTHER PARITY signal on line 139 is coupled to an input of a data latch within a first group of data latches 191. Similarly, the OTHER PRIMARY REQUEST and the OTHER WARNS ME signals received by the backup module from the other programmable controller are applied to the inputs of other data latches in set 191. The logic levels of these signals are stored in the respective data latches upon the receipt of a CLOCK pulse on line 194 which is produced by clock circuit 127 within the backup module. Therefore each time a clock pulse occurs a bit sample of each input signal is stored in a latch. The outputs of each latch within set 191 are connected to inputs of a second group of data latches 192 which have outputs that are connected in turn to inputs of a third group of latches 193. Each latch within the second and third groups 192 and 193 is clocked by the CLOCK signal on line 194. The three groups of latches 191-193 form a cascade through which the cable data flows. At any given time the three groups of latches 191-193 store three bit samples of each input signal from the control cable 23.

The outputs from the third set of data latches 193 are coupled as inputs to a parity check circuit 196. The parity check circuit 196 includes an internal parity generator similar to device 190 and derives a parity bit from the bit samples of the OTHER PRIMARY REQUEST and OTHER WARNS ME signals. The OTHER PARITY signal passes through the cascade of data latches 191-193 and ultimately is applied to the parity check circuit 196. The internally generated parity bit is compared by the parity check circuit to OTHER PARITY bit. If the two parity bits are different, the parity check circuit 196 produces an active BAD PARITY output signal on line 198.

The three outputs from each group of data latches 191-193 are applied as inputs to three comparators 200, 201 and 202. The first comparator 200 compares the bit samples from the three latches which represent the OTHER PARITY signal to determine whether all three bits are identical. The second and third comparators 201 and 202 independently perform similar comparisons of the trios of bit samples from the data latches which represent the OTHER PRIMARY REQUEST and OTHER WARNS ME signals. The results of the three independent comparisons are AND'ed by gate 203 to produce an output signal designated EQUAL. The EQUAL signal will be at a high, or active, logic level when each trio of bit samples has the same logic level, or in other words when each signal has not changed for two or three clock periods. Note that the three cable signals, OTHER PRIMARY REQUEST, OTHER WARNS ME and OTHER PARITY, can have different logic levels and the EQUAL signal can still be active.

The BAD PARITY and EQUAL signals are applied as inputs to AND gate 204 which produces an output signal connected to a first data latch 205. When the first data latch 205 is enabled by the CLOCK signal on line 194, the output from AND gate 204 is stored to produce the CABLE ERROR signal. The CABLE ERROR signal is applied from data latch 205 to one of the tri-state data buffers in set 158 that is connected to the backup module data bus 122 as shown in FIG. 10.

The output of AND gate 204 also is applied as an input to OR gate 206 having an output coupled to the input of a second data latch 208. This data latch 208 is enabled by the CLOCK signal on line 194 to produce an output designated LATCHED CABLE ERROR, which is coupled back to the other input of OR gate 206. The LATCHED CABLE ERROR signal also is coupled to another data buffer within set 158 in FIG. 10. Both data latches 205 and 208 are cleared by the CLEAR CABLE ERROR signal that is received from a first set of data latches 156 in the primary/secondary arbiter 132 illustrated in FIG. 10.

The OTHER PARITY REQUEST and the OTHER WARNS ME signals are applied to the cascade of data latches 191, 192 and 193 and are clocked through the latches by the backup module CLOCK signal on line 194 which has no temporal relationship to the two input signals. The received data advances through the cascade on subsequent clock cycles. The data at the output of the third group of latches 193 in the cascade is checked by the parity circuit 196. If the parity is incorrect, as defined by the OTHER PARITY bit sent by the other programmable controller, then the BAD PARITY signal is asserted on line 198.

At the same time, the comparator 200 is comparing the three bits of each signal passing through the cascade. If the three bits of the OTHER PRIMARY REQUEST are equal, and the three bits of the OTHER PARITY are equal, and the three bits of the OTHER WARNS ME signal are equal, then the comparator produces an active EQUAL signal which is applied along with the BAD PARITY signal to the AND gate 204. Performing a logic AND of the BAD PARITY and EQUAL signals determines whether a fault exists in the transmission of data. A valid cable fault must have persisted in the same state for two to three clock periods in order for an error signal to be emitted by latches 205 and 208. The LATCHED CABLE ERROR signal from device 208 is read periodically by the microprocessor 125 in the backup module 22 by enabling the first set of data buffers 158 in the arbiter circuit 132. An active CABLE ERROR signal causes the microprocessor 125 to take the appropriate error correction or failure action. The LATCHED CABLE ERROR signal produced by data latch 208 is asserted at the same time as the CABLE ERROR signal, but persists until a CLEAR CABLE ERROR signal is asserted by the microcomputer 125, even if the actual parity error condition on the control cable 23 is corrected.

The CABLE ERROR and LATCHED CABLE ERROR signals indicate that improper parity was detected on the control cable 23 for between two and three clock cycles. In order for the cable error detection scheme to be effective, the asynchronous signals must periodically remain constant for two to three clock periods. However, since the control signals on cable 23 between the two programmable controllers 12' and 12" rarely change, and since cable disconnections typically persist far in excess of three clock cycles, the error checking scheme is appropriate for this application. The use of the cascade of data latches 191-193 is used to verify the stability of the cable signals during this period of time. The latch cascade verifies the stabilities of these signals which may have been in the process of changing when sampled by the first set of latches 191 in the cascade or which may have momentarily shown incorrect parity due to signal propagation delays from the other programmable controller.

Data communication errors on control cable 23 can result from damaged cable conductors or components, the disconnected control cable, or a power-down of the other programmable controller. Induced cable noise is also a possible cause, although the requirement that three successive samples of the signal be identical before an error is indicated, serves to reduce greatly the probability of noise related errors.

From the point of view of a programmable controller that is qualified to be the secondary device, any of these cable error causes could result in the negation of the OTHER PRIMARY REQUEST signal which is used by the state machine 150 to generate a SWITCHOVER INTERRUPT. As a result, when the microcomputer 125 in the backup module of a secondary qualified programmable controller receives the SWITCHOVER INTERRUPT, it begins executing an interrupt routine. This interrupt routine must sample the CLEAR CABLE ERROR or LATCHED CABLE ERROR signal in order to determine whether or not a cable error has occurred. This error signal should be sampled a number of times, for example a minimum of five samples. If any of the samples show a cable error condition, the cable is assumed to have experienced a major fault.

If the interrupt routine completed the sampling of the CABLE ERROR signal without detecting a fault, then the other programmable controller is either in the process of powering down or cable noise has caused the interrupt. If the other system is powering down, then the state machine 150 will eventually reach the controlling state, as previously described. When this state is reached, the present system can safely be switched over to primary status. A power-down of the other programmable controller will not cause an immediate cable error because the system's reset will occur sometime before it actually loses power. When the reset occurs, its MY PRIMARY REQUEST signal will be negated, but its parity generator will continue to function properly until power actually goes down.

If momentary noise causes the switchover interrupt, then the state machine 150 will eventually return to the qualified secondary state, as it is able to tolerate one bad signal sample on the other primary request conductor 135.

The WARN OTHER signal is generated by the microcomputer 125 in the backup module as a mechanism of quickly and reliably communicating to the other programmable controller that it has detected a problem with the other device or would like to disable the other device. If the primary programmable controller sends this signal to a secondary, the secondary will become disqualified and unable to assume control of the system. If the secondary sends the WARN OTHER signal to the primary, the primary runs an extended diagnostic routine to determine for itself whether or not it is in a fault condition. Usually, secondary programmable controllers are incapable of directly bringing the primary programmable controller down. It should be noted that the WARN OTHER signal becomes the OTHER WARNS ME signal at the recipient programmable controller.

The invention being claimed is:

1. In a programmable controller having a memory which stores a control program and data, and a processor for executing the control program to receive data from input/output circuits which connect to a machine being controlled and for sending data to the input/output circuits for operating devices on the machine; wherein the improvement comprises:

an input means for receiving a first signal indicating that another programmable controller, which is connected to the same input/output circuits, requests to operate in an active mode;

a first terminal for receiving a second signal indicating that the programmable controller is to operate in the active mode when a plurality of programmable controllers are requesting to operate in the active mode at substantially the same time;

mode indicator means for designating that the programmable controller is to operate in the active mode in response to said input means not receiving the first signal, and in response to said input means receiving the first signal and to said first terminal receiving the second signal, otherwise said mode indicator means designating that the programmable controller is to operate in a backup mode; and an output means for transmitting a third signal to the other programmable controller when said mode indicator means designates that the programmable controller is to operate in the active mode, the third signal not being transmitted when said mode indicator means designates that the programmable controller is to operate in the backup mode.

2. The programmable controller as recited in claim 1 further comprising a source of a given logic level which is applied to a second terminal; and a cable for connecting said input means and said output means to the other programmable controller, only one end of said cable having a conductor which connects said first terminal to the second terminal to produce the third signal.

3. The programmable controller as recited in claim 1 further comprising a communication interface for transmitting state data of the input/output circuits and control data to the other programmable controller that is connected to the same input/output circuits, and for receiving state data of the input/output circuits and control data from the other programmable controller.

4. The programmable controller as recited in claim 1 further comprising means for inhibiting the sending data to the input/output circuits when the programmable controller is not in the active mode.

5. The programmable controller as recited in claim 1 further comprising a fault means for signalling that a fault has occurred in the programmable controller; and wherein said mode indicator means also designates that the programmable controller is to operate in the active mode only when the fault means is not signalling that a fault has occurred.

6. The programmable controller as recited in claim 1 further comprising a means for detecting a malfunction of the other programmable controller; and means for transmitting a warning to the other programmable controller when an error is detected.

7. The programmable controller as recited in claim 1 further comprising a receiver for a warning from the other programmable controller; and wherein said mode indicator means designates that the programmable controller is to operate in a disqualified mode when a warning is received.

8. The programmable controller as recited in claim 1 further comprising a receiver for a warning from the other programmable controller; and means for performing a diagnostic analysis of the programmable controller when a warning is received.

9. In a programmable controller having a memory which stores a control program, an I/O image table and a data table, and having a processor for executing the control program to examine and alter the I/O image table, and having means for exchanging data between the memory and a machine being controller; wherein the improvement comprises a backup module comprising:

an input means for receiving an first active mode request signal and a first warning signal from another programmable controller that is connected to the same machine;

means for producing a tie breaker signal that indicates whether the programmable controller is to operate in the active mode when a plurality of programmable controllers are requesting to operate in the active mode at substantially the same time;

mode indicator means for indicating a mode in which the programmable controller is to operate, which indicates an active mode in response to said input means not receiving the first active mode request signal, or in response to said input means receiving the first active mode request signal and to the tie breaker signal from said means for producing, said mode indicator means otherwise indicating that the programmable controller is to operate in the backup mode unless the first warning signal is received in which case said mode indicator means indicates a disqualified mode; and an output means for transmitting a second active mode request signal to the other programmable controller when said mode indicator means designates the active mode.

10. The programmable controller as recited in claim 9 further including means for producing a second warning signal indicating a potential problem exists in the functioning of the other programmable controller; and wherein said output means is also for sending the second warning signal to the other programmable controller.

11. The programmable controller as recited in claim 9 wherein said means for producing a tie breaker signal includes a first terminal to which a given logic level is applied, and a second terminal, the tie breaker signal being produced when the given logic level is applied to the second terminal; and said programmable controller further comprising a cable for connecting said input means and said output means to the other programmable controller, and one and only one end of said cable having a conductor that connects the first terminal to the second terminal to produce the tie breaker signal.

12. The programmable controller as recited in claim 9 further comprising a communication interface for transmitting data from the I/O image table and control data to the other programmable controller, and for receiving I/O image table data and control data from the other programmable controller.

13. The programmable controller as recited in claim 9 further comprising a fault means for signalling that an error has occurred in the programmable controller; and wherein said mode indicator means also designates the disqualified mode when the fault means is signalling that an error has occurred.

* * * * *